United States Patent [19]

Sumi

[11] Patent Number: 5,505,602
[45] Date of Patent: Apr. 9, 1996

[54] MOLD FOR PRODUCING A WEATHER STRIP

[75] Inventor: Toshiyuki Sumi, Nakashima, Japan

[73] Assignee: Toyoda Gosei Co., Ltd., Japan

[21] Appl. No.: 217,661

[22] Filed: Mar. 25, 1994

[30] Foreign Application Priority Data

Mar. 31, 1993 [JP] Japan .................... 5-096823

[51] Int. Cl.⁶ .................... B29C 45/14; B29C 45/26
[52] U.S. Cl. .................... 425/116; 425/117; 425/123; 425/542; 425/806; 264/328.9; 264/261
[58] Field of Search .................... 425/116, 123, 425/129.1, 577, 806, 117, 542; 264/328.9, 261

[56] References Cited

U.S. PATENT DOCUMENTS

| | | | |
|---|---|---|---|
| 4,501,715 | 2/1985 | Barfield et al. | 425/806 |
| 4,655,699 | 4/1987 | Colier | 425/806 |
| 4,884,370 | 12/1989 | Nozaki et al. | |
| 5,407,341 | 4/1995 | Endo et al. | 264/328.9 |

FOREIGN PATENT DOCUMENTS

| | | | |
|---|---|---|---|
| 55-46537 | 4/1980 | Japan | 264/328.9 |
| 62-178310 | 8/1987 | Japan | 264/328.9 |
| 567927 | 10/1975 | Switzerland | 425/806 |

*Primary Examiner*—Khanh P. Nguyen
*Attorney, Agent, or Firm*—Cushman Darby & Cushman

[57] ABSTRACT

A mold for joining a molded portion onto an end of an extruded weather strip without having any looseness in the joint formed therebetween, and which facilitates removal of a fin formed in the molded portion. The mold includes mold members defining a cavity at an end of which an end of the extruded weather strip is placed, and to which a molding material is injected. The mold members further define a tunnellike additional cavity in a parting plane therebetween. The tunnellike additional cavity extends along a peripheral edge of the cavity so that an end thereof is located at the position beyond the end of the extruded weather strip. A passage is also defined in the parting plane so as to interconnect the cavity and the tunnellike additional cavity for introducing a molding material into the tunnellike additional cavity. The passage extends to a position close to but not beyond the end of the extruded weather strip.

5 Claims, 4 Drawing Sheets

MOLD FOR PRODUCING A WEATHER STRIP

BACKGROUND OF THE INVENTION

1. Field of the Invention

The present invention relates to a mold for joining a molded portion to an end of an extruded weather strip.

2. Description of Related Art

FIG. 1 illustrates one example of a weather strip having a molded portion which is joined to an end of an extruded weather strip. As shown, a weather strip (which is generally called a glass run) 14 is continuously attached to a door frame 10 and a door panel 11 of a motor vehicle to guide a door glass 12 to a closed or open position, and seal the door frame 10 and a peripheral edge of the closed door glass 12. This weather strip 14 is composed of extruded weather strips 14A, 14B, 14D and 14E, and molded portions 14C, 14F and 14G. The molded portion 14C joins opposed ends of the extruded weather strips 14A and 14B, the molded portion 14F joins opposed ends of the extruded weather strips 14A and 14D, and the molded portion 14G joins opposed ends of the extruded weather strips 14B and 14G.

FIG. 2 illustrates a corner portion of the weather strip 14, which is composed of the molded portion 14C. FIG. 3 is a plan view of a cavity of a conventional mold for forming the molded portion 14C, which is taken along a parting plane thereof, and FIG. 4 illustrates a cross-section one part of the cavity, which is taken along the line of 4—4 of FIG. 3.

In order to form the molded portion 14C, as shown in FIG. 3, ends of the extruded weather strips 14A and 14B are respectively placed at ends of a cavity 16. Then, a molding material is injected into the cavity 16.

As shown in FIG. 2, the molded portion 14C has a tubular sealing portion 18. This sealing portion 18 is molded in the part of the cavity 16, which is defined by an upper mold member 20A, a lower mold member 20B and a core member 20C, as shown in FIG. 4. Upon injection of a molding material, it is likely to enter the parting plane 22 between the upper mold member 20A and the lower mold member 20B, thus forming fins along upper and lower edges 18A and 18B of the sealing portion 18 of the resulting molded portion 14C. When the obtained weather strip 14 is attached to the inside of the door frame 10 (FIG. 1), the fin formed along the upper edge 18A is covered with and concealed by the door frame 10. However, the fin formed along the lower edge 18B is exposed to external view, thus degrading both the appearance of the weather strip 14 and the sealing properties thereof. Accordingly, removal of this fin is necessary, but the process of removing the fin is extremely troublesome.

In order to facilitate the removal of the fin, a mold as illustrated in FIGS. 5 and 6 has been used. As shown, a tunnel-like additional cavity 24 is formed in the parting plane 22 between the upper mold member 20A and the lower mold member 20B next to a peripheral edge of cavity 16, where the fin to be removed forms.

The ends of the additional cavity 24 are respectively located at the positions beyond the ends 28A, 28B of the weather strips 14A and 14B. A passage 26 having a narrow width of 0.11 to 0.15 mm is also formed in the parting place 22 so as to interconnect the cavity 16 with the additional cavity 24, thereby allowing the molding material injected into the cavity 16 to enter the additional cavity 24.

Due to the additional cavity 24 and the passage 26, a fin of which an edge is thick is formed along the lower edge 18B of the sealing portion 18 of the resulting molded portion 14C. This fin is easily removed by ripping it off along the thin root portion formed by passage 26 filling with molding material.

However, in this case, the joints between the molded portion 14C and the respective end surfaces 28A and 28B of the weather strips 14A and 14B are likely to become loose.

The looseness in the joints is caused when the molding material is injected, as part of the molding material escapes into the additional cavity 24. Even if a sufficient amount of the molding material is injected, taking into account the escape to the additional cavity 24, the injection pressure tends to gradually decrease toward the ends of the cavity 16. As a result, the pressure of the molding material pushing the end surfaces 28a and 28B of the extruded weather strips 14A and 14B becomes insufficient to form a good joint therebetween.

If the extruded weather strips 14A and 14B are placed so as to be offset outwardly of the cavity 16, the joints between the molded portion 14C and the extruded weather strips 14A and 14B are likely to become loose.

SUMMARY OF THE INVENTION

It is an object of the present invention to provide a mold which facilitates the removal of an undesirable fin, and which prevents the joint between the molded portion and the extruded weather strip from becoming loose The mold in accordance with the present invention has mold members defining a cavity at an end of which an end of an extruded weather strip is placed, and into which a molding material is injected. The mold members further define a tunnel-like additional cavity in the parting place thereof along the periphery of the cavity so as to be spaced therefrom. This additional cavity extends beyond the position at which the end of the extruded weather strip is placed. The mold members still further define a passage in the above-described parting plane so as to interconnect the cavity and the tunnellike additional cavity for introducing part of the molding material into the additional cavity. This passage has a length shorter than that of the additional cavity, and extends close to but not beyond the position at which the end of the extruded weather strip is placed.

When the molding material is injected into the cavity of the mold having the above-described construction, one part thereof flows into the additional cavity via the passage. However, the molding material flowing to the end of the cavity is blocked from flowing directly into the additional cavity because the passage has been shortened. As a result, in the end of the cavity, the injection pressure of the molding material is entirely applied to the end surface of the extruded weather strip. Accordingly, a sufficient pressure for pushing the end surface of the extruded weather strip can be obtained, and the resulting molded portion can be joined to the end surface of the extruded weather strip without looseness occurring in the joint therebetween.

Other objects, features and characteristics of the present invention will become apparent upon consideration of the following description and the appended claims with reference to the accompanying drawings, all of which form a part of this specification.

DETAILED DESCRIPTION OF THE INVENTION OF THE PRESENTLY PREFERRED EXEMPLARY EMBODIMENTS

Figure 1:
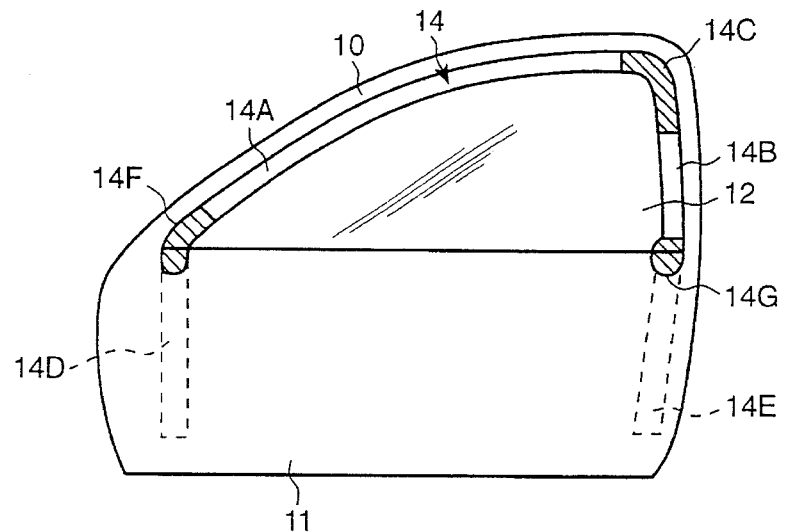
FIG. 1 is a view illustrating a weather strip attached along a door of a motor vehicle.
Figure 2:
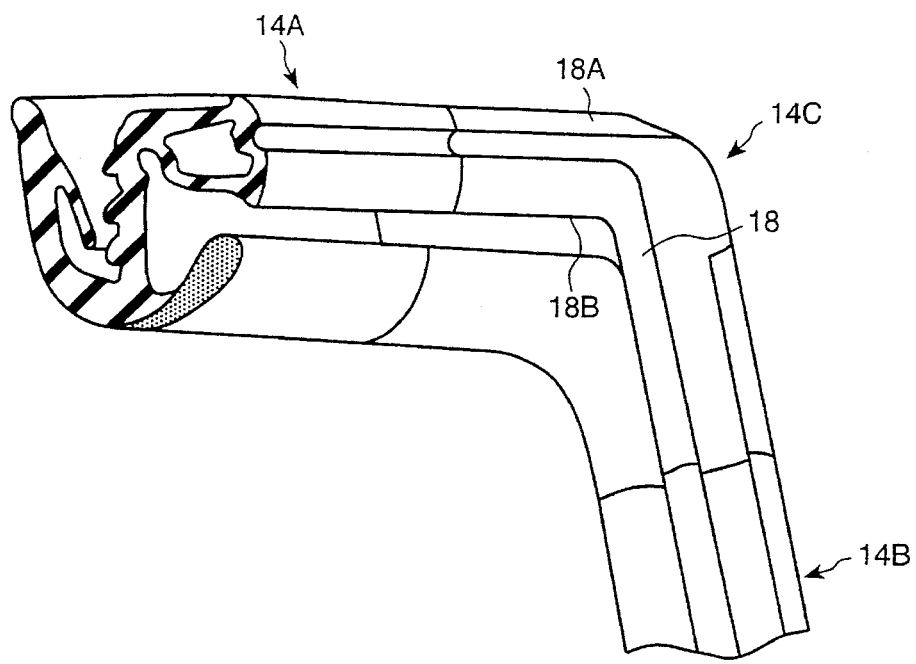
FIG. 2 is a perspective view illustrating a corner portion of the weather strip of FIG. 1.
Figure 3:
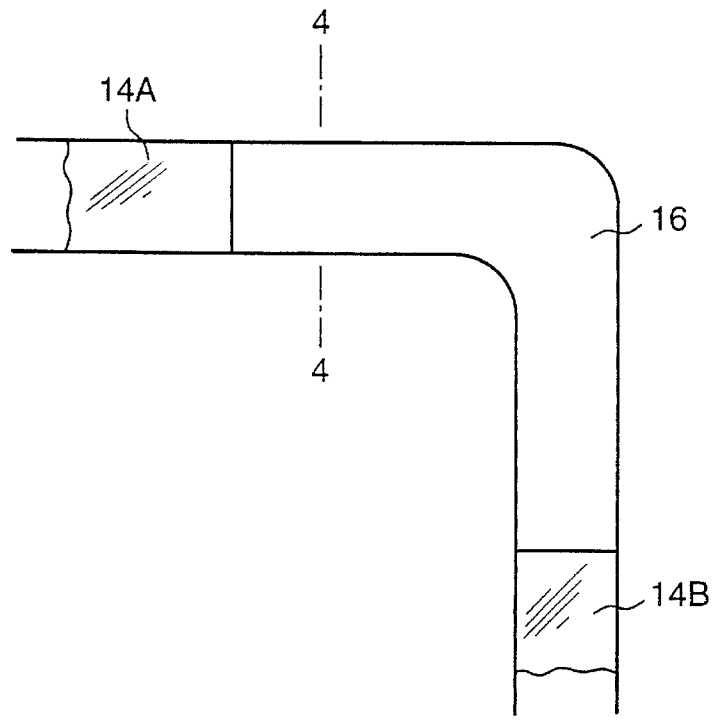
FIG. 3 is a plan view of a cavity of a conventional mold for forming a corner portion of the weather strip taken along the parting plane thereof.
Figure 4:
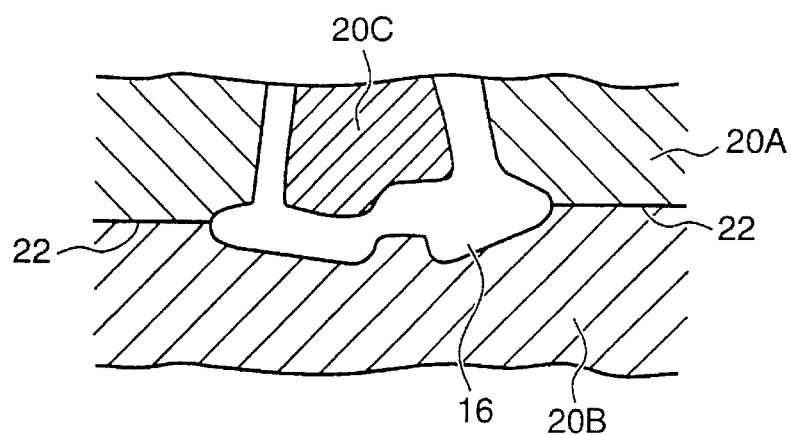
FIG. 4 is a cross-sectional view of one part of a cavity taken along the line 4—4 of FIG.
Figure 5:
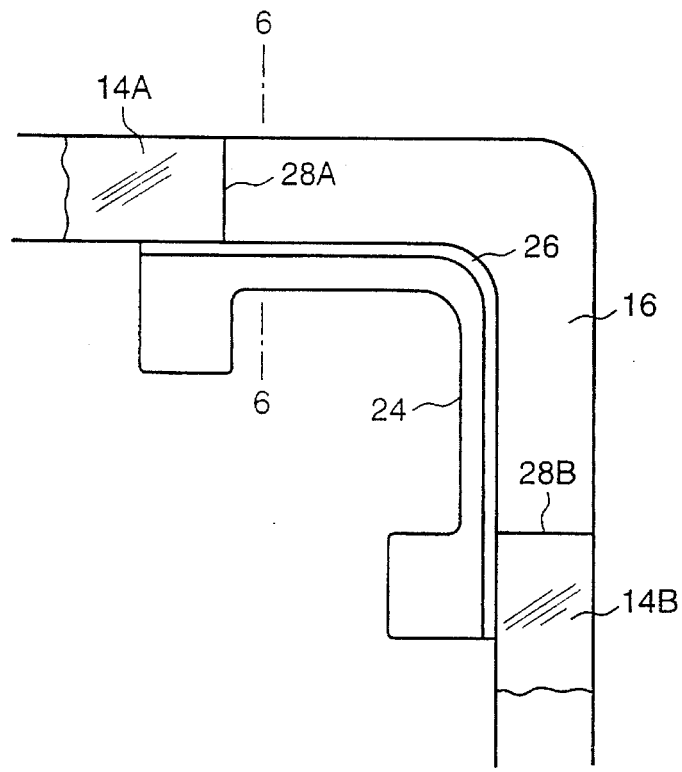
FIG. 5 is a plan view of a cavity of another conventional mold taken along the parting plane thereof.
Figure 6:
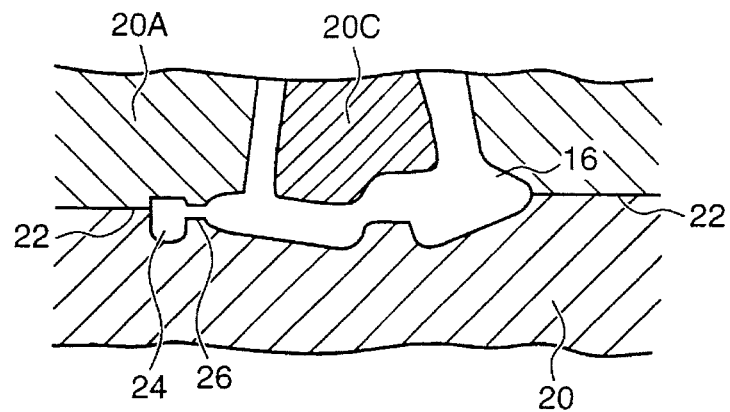
FIG. 6 is a cross-sectional view of one part of a cavity taken along the line 6—6 of FIG.
Figure 7:
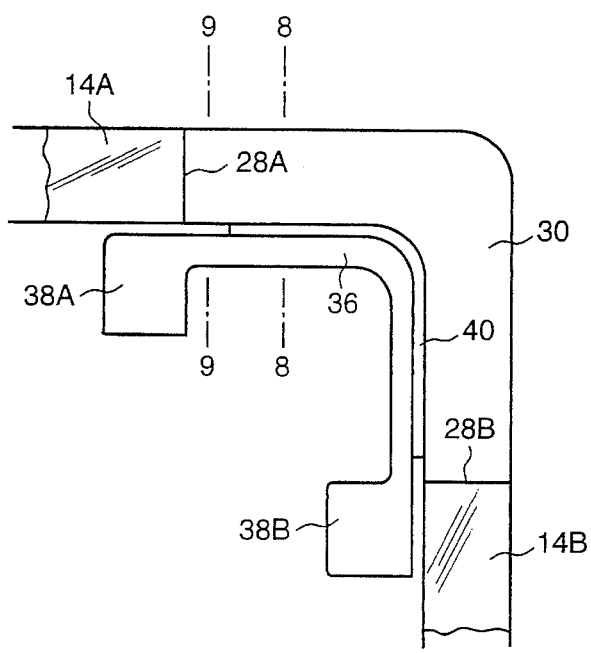
FIG. 7 is a plan view of a cavity of a mold provided in accordance with the present invention taken along the parting plane of the mold.

A molded portion 14C which joins two extruded weather strips 14A and 14B into a corner-like configuration, as shown in FIG. 2, is formed by a mold shown in FIG. 7. Ends of the extruded weather strips 14A and 14B are placed at both ends of the cavity 30 of an L-shaped configuration, and a molding material is injected into the cavity 30 through a gate (not shown)

Figure 8:
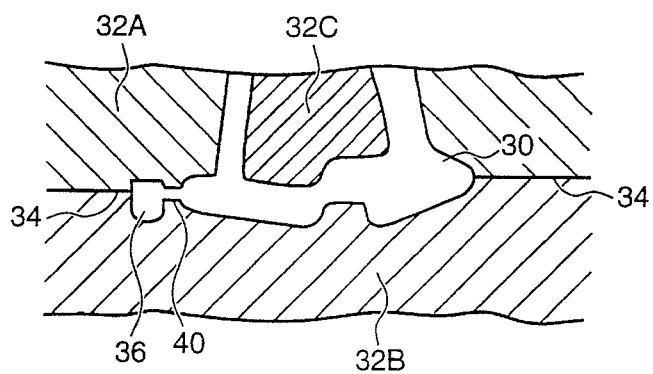
FIG. 8 is a cross-sectional view of one part of a cavity taken along the line 8—8 of FIG. 7.
Figure 9:
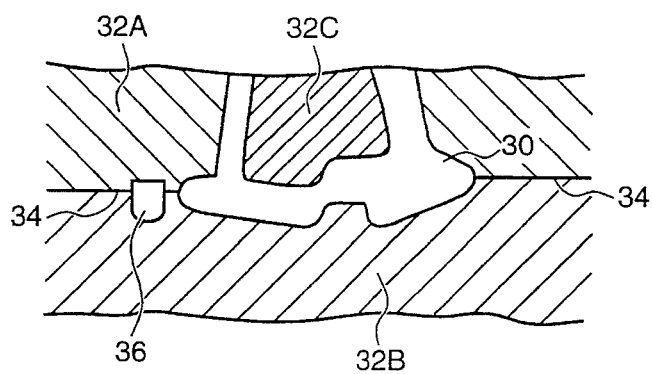
FIG. 9 is a cross-sectional view of one part of the cavity taken along the line 9—9 of FIG. 7.

As shown in FIGS. 8 and 9, one part of the cavity 30, which serves to form a sealing portion 18 (FIG. 2) of the molded portion 14C, is defined by an upper mold member 32A, a lower mold member 32B and a core member 32C. The parting plane 34 between the upper mold member 32A and the lower mold member 32B is located along both edges of the sealing portion-forming part of the cavity 30. A tunnellike additional cavity 36 is formed in the parting plane 34 so as to be spaced from the cavity 30 by a small amount. As shown in FIG. 7, the additional cavity 36 extends along the internal side of the cavity 30, and both ends 38A and 38B are located at positions beyond the end surfaces 28A and 28B of the extruded weather strips 14A and 14B, which are placed at the ends of the cavity 30. The ends 38A and 38B respectively have a width larger than that of the remaining portion of the additional cavity 36.

As shown in FIGS. 7 and 8, a passage 40 is also formed in the parting plane 34 so as to interconnect the cavity 30 and the additional cavity 36. The passage 40 has a width of 0.11 to 0.15 mm, and a length shorter than that of the additional cavity 36. Both ends of the passage 40 are located close to the end surfaces 28A and 28B of the extruded weather strips 14A and 14B, and are separated from the end surfaces 28A and 28B by a space of about 3 to 6 mm on the side of the cavity 30 nearest the center thereof. As shown in FIG. 8, no passage is formed in the vicinity of the end surfaces 28A and 28B of the extruded weather strips 14A and 14B.

When the molded portion 14C is formed by the mold having the above-described construction, a fin having a thin root portion and a thick end edge portion is formed along the lower end edge 18B of the sealing portion 18. This fin can be easily removed by gradually ripping it off along the thin root portion while pinching the thick end edge portion.

One part of the molding material flows into the additional cavity 36 via the passage 40 on the way to the end surfaces 28A and 28B of the extruded weather strips 14A and 14B. However, the escape of any molding material does not occur near the end surfaces 28A and 28B, as there is no passage for the molding material to flow through. Accordingly, the injection pressure of the molding material is maintained at a high level at the end surfaces 28A and 28B. Thus, the molding material is concentrically applied to the end surfaces 28A and 28B. As a result, the molding material is securely joined to the end surfaces 28A and 28B, and accordingly, the joints between the molded portion 14C and the end surfaces 28A and 28B of the extruded weather strips 14A and 14B do not become loose.

In the vicinity of the end surfaces 28A and 28B of the extruded weather strips 14A and 14B, where no passage is formed, fins are formed along the parting plane 34. However, these fins are of a very small length so as to make removal thereof simple.

The mold in accordance with the present invention can be applied to not only the formation of the molded portion 14C but also to the formation of the molded portions 14F and 14G which respectively joins the extruded weather strips 14A and 14B and the extruded weather strips 14D and 14E.

With the mold of the present invention, a molded portion can be joined onto an end of an extruded weather strip without looseness occurring in the joint therebetween. In addition, the fin formed in the molded portion can be removed with ease.

While the invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A mold for joining a molded portion to an end of an extruded weather strip, comprising;

mold members defining a main cavity at an end of which said end of said extruded weather strip is placed, and into which a molding material is injected, a tunnel-like additional cavity formed in a parting plane of said mold members next to a peripheral edge of said main cavity and spaced from said main cavity by a distance, said additional cavity extending beyond a position at which said end of said extruded weather strip is placed, and a passage formed in said parting plane so as to interconnect said main cavity and said tunnel-like additional cavity and adapted to introduce part of said molding material injected into said main cavity into said tunnel-like additional cavity, said passage having a length shorter than that of said tunnel-like additional cavity and extending close to but not beyond said position at which said end of said extruded weather strip is placed.

2. The mold according to claim 1, wherein said passage has a width of 0.11 to 0.15 mm.

3. The mold according to claim 1, wherein an end of said passage is spaced from said position at which said end of said extruded weather strip is placed by a space of 3 to 6 mm.

4. The mold according to claim 1, wherein said mold is adapted to form a molded portion which joins ends of two extruded weather strips to be attached along a door frame into a corner-like configuration, said mold members including an upper mold member and a lower mold member defining said main cavity at both ends of which said ends of said two extruded weather strips are placed, respectively, said tunnel-like additional cavity being formed in a parting plane between said upper mold member and said lower mold member on an inner side of said main cavity so as to be spaced from a periphery of said main cavity by said distance, both ends of said tunnel-like additional cavity being located beyond positions at which said ends of said two extruded weather strips are placed, said passage being formed in said parting plane so as to interconnect said main cavity and said tunnel-like additional cavity, said passage having a length shorter than that of said tunnel-like additional passage, and ends of said passage being disposed on the side towards a center of said main cavity close to said positions at which said ends of said two extruded weather strips are placed.

5. A mold adapted to use for forming weather stripping, said mold comprising:

upper and lower mold members defining a first section, a second section, and a third section;

wherein said first section includes a cavity adapted to form a molded portion of said weather stripping and adapted to accept extruded portions, each extruded portion having an end positioned in said cavity at a location where a joint between said molded portion and said extruded portion is formed;

wherein said third section includes a tunnel-like channel formed proximate said cavity, said tunnel-like channel having a length greater than that of said cavity and having enlarged ends; and wherein said second section includes a passage connecting said first section and said third section, said second section having a length shorter than that of said cavity and a substantially nominal thickness.

* * * * *